(12) United States Patent
Seifert (10) Patent No.: US 7,371,019 B2
(45) Date of Patent: May 13, 2008

(54) METHOD AND APPARATUS FOR SENSING LIGHT

(75) Inventor: Martin Seifert, West Simsbury, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 11/300,572

(22) Filed: Dec. 13, 2005

(65) Prior Publication Data

US 2006/0165343 A1    Jul. 27, 2006

Related U.S. Application Data

(60) Provisional application No. 60/635,923, filed on Dec. 13, 2004.

(51) Int. Cl.
*G02B 6/255* (2006.01)
(52) U.S. Cl. .................. 385/96; 385/95; 385/97; 385/98
(58) Field of Classification Search .......... 385/95–99
See application file for complete search history.

(56) References Cited

U.S. PATENT DOCUMENTS

| | | | |
|---|---|---|---|
| 3,936,631 A | | 2/1976 | Muska |
| 4,165,496 A | * | 8/1979 | Di Domenico et al. ...... 372/31 |
| 4,371,897 A | | 2/1983 | Kramer |
| 4,466,697 A | | 8/1984 | Daniel |
| 4,475,789 A | * | 10/1984 | Kahn ........................ 385/48 |
| 4,618,211 A | | 10/1986 | Fleury, V |
| 4,618,212 A | * | 10/1986 | Ludington et al. .......... 385/98 |
| 4,848,999 A | | 7/1989 | Taylor |
| 4,923,273 A | | 5/1990 | Taylor |
| 5,179,275 A | * | 1/1993 | Lieber et al. .......... 250/227.24 |
| 5,278,932 A | * | 1/1994 | DeVeau et al. ............. 385/134 |
| 5,315,365 A | * | 5/1994 | Hakimi et al. ............. 356/73.1 |
| 6,337,939 B1 | | 1/2002 | Aspell |
| 6,389,186 B1 | | 5/2002 | DiGiovanni |
| 6,424,663 B1 | | 7/2002 | Fidric |
| 6,481,903 B1 | * | 11/2002 | Varma et al. ................. 385/99 |
| 6,513,994 B1 | * | 2/2003 | DiGiovanni et al. ......... 385/95 |

(Continued)

FOREIGN PATENT DOCUMENTS

| | | |
|---|---|---|
| DE | 4313795 | 11/1994 |
| JP | 55035350 | 3/1980 |
| WO | WO 2005/103779 A1 | 11/2005 |

OTHER PUBLICATIONS

Inada et al. "Splicing of Fibers by the Fusion Method." IEEE Journal on Selected Areas in Communications. vol. 4, No. 5, Aug. 1986, pp. 706-713.*

(Continued)

*Primary Examiner*—M. R. Connelly-Cushwa
*Assistant Examiner*—Rhonda S Peace
(74) *Attorney, Agent, or Firm*—Peter J. Rainville (57) ABSTRACT

Disclosed is an optical apparatus including an optical fiber having a wavelength of operation, the optical fiber comprising a first length of the optical fiber joined to a second length of the optical fiber with a splice such that the first and second lengths are in optical communication; a photodetector for sensing light leaking from the splice; and wherein the splice has a splice loss of not greater than 0.5 dB at the wavelength of operation. Methods of sensing light are also disclosed.

44 Claims, 8 Drawing Sheets

U.S. PATENT DOCUMENTS

| | | |
|---|---|---|
| 6,687,445 B2 * | 2/2004 | Carter et al. ................. 385/127 |
| 6,741,081 B1 * | 5/2004 | Eslambolchi et al. ....... 324/541 |
| 7,058,267 B2 * | 6/2006 | Neuhaus et al. .............. 385/48 |
| 2002/0197027 A1 * | 12/2002 | Saito et al. ................... 385/96 |
| 2006/0013532 A1 | 1/2006 | Wan |
| 2007/0036499 A1 * | 2/2007 | Shukunami et al. ........ 385/128 |

OTHER PUBLICATIONS

Toeppen, United States Statutory Invention Registration H1426, "Apparatus and method for determining the optical power passing through an optical fiber", Published Apr. 4, 1995.

* cited by examiner

METHOD AND APPARATUS FOR SENSING LIGHT

CROSS-REFERENCE TO RELATED APPLICATION

This application claims priority to provisional patent application 60/635,923, filed Dec. 13, 2004 and entitled, "Method and apparatus for sensing light", and which is herein incorporated by reference.

FIELD OF THE INVENTION

The present invention relates to methods and apparatus for sensing electromagnetic energy (e.g., light) from an optical apparatus, such as, for example, from an optical fiber, laser or amplifier, and optical apparatus that includes provision for such sensing.

BACKGROUND

It is often desirable to be aware of some property (e.g., wavelength, intensity, etc.) of the light associated with an optical apparatus. The term "light" as used herein, means, as understood by one of ordinary skill in the optical arts, the electromagnetic energy associated with the optical apparatus in question, and is not to be limited to, for example, wavelengths visible to the human eye, which is a definition that can be found in certain dictionaries intended for laypersons. For example, an optical fiber amplifier typically includes a section or length of optical fiber that comprises an active material (e.g., a rare earth or Raman active material). The optical amplifier can receive input light having a first wavelength and, responsive to receiving pump electromagnetic energy having a second wavelength that is different than the first wavelength, can amplify the input electromagnetic energy to provide an optical output. It can be desirable to be aware of one or more of the properties of the input electromagnetic energy, pump light or output light to, for example, monitor the performance of the amplifier. Feedback can be provided responsive to one or more properties of the sensed light so as to adjust one or more performance characteristics of the amplifier.

One way to monitor the performance of the amplifier is to interpose a coupling device, such as, for example, an optical fiber fused coupler, between sections of the amplifier. Such a coupler can include an input fiber arm, and output fiber arm, and a coupled fiber arm, where the coupled arm is usually in optical communication with a detector, such as, for example, a photodetector. To sense input light, the input arm can be spliced to a fiber propagating the input light to be amplified and the output arm can be spliced to a rare earth doped fiber that will amplify the input light. Typically the coupler senses a selected portion (e.g., 1%) of the optical power of the input light.

While an arrangement such as the foregoing can be useful, and is often employed, there can be drawbacks. For example, in certain applications, optical fiber couplers can add cost to an optical apparatus, require a skilled technician to install or fabricate, be cumbersome to employ, or add an additional mode of failure, thus reducing reliability. Improved methods and apparatus would be a welcome advance in the art.

SUMMARY OF THE INVENTION

In one aspect, the invention provides an optical apparatus comprising an optical fiber including a first length of the optical fiber joined to a second length of the optical fiber with a splice such that the first and second lengths are in optical communication; and an optical sensor for sensing light leaking from the splice. The splice can be a fusion splice. Such a splice is often already present in an optical apparatus, such that sensing light from the splice raises fewer concerns regarding product reliability and the like than adding a coupling device dedicated to facilitating the sensing of light.

The optical fiber can propagate pump light and the optical sensor can sense pump light. The first length of optical fiber can comprise a double-clad fiber having an inner cladding for propagating the pump light. The optical apparatus can include circuitry responsive to the sensor for providing a selected relationship between sensed light and an output signal of the circuitry. The circuitry can comprise, for example, a processor, such as, for example, a controller. The optical apparatus can include a rare earth for providing first light having a first wavelength responsive to receiving pump light having a wavelength that is different than the first wavelength. One of the lengths of the optical fiber can include the rare earth. The optical apparatus can include at least one pump light source for providing the pump light. The optical apparatus can include at least one reflective element for forming at least a part of a laser resonator. The optical sensor can be located adjacent the splice. The optical sensor can be arranged so as to be capable of receiving light from substantially only the splice.

In another aspect, the invention can provide an optical apparatus comprising a body having a longitudinal passage therethrough, where the passage is dimensioned for receiving a length of optical fiber including a splice, and where the body further comprises at least one surface for receiving a sensor. When the sensor is received by the surface and the length of fiber is received by the passage, light from the fiber splice can be received by the sensor. The optical apparatus can include the optical sensor. The optical apparatus can include the length of optical fiber including the splice.

The passage can include a longitudinally extending opening wherein the body can receive the length of fiber including the splice without threading an end of the length of fiber through the entire passage. The optical apparatus can include a second body for mating with the body, where the second body when mated with the body closes at least in part the longitudinally extending opening of the passage. The second body can comprise a housing having an interior wall and wherein the body attaches to the interior wall. The surface can include an opening to the passage. Each of the bodies can be unitary or alternatively, can be integral, meaning that they can be formed by combining two or more distinct parts to form the body.

In an additional aspect, the invention can provide an optical apparatus comprising a first optical waveguide; a second optical waveguide; means for providing optical communication between the first and second optical elements; and means for sensing stray light from the means for providing optical communication, where the means for sensing can provide an output signal that is responsive to a property of the sensed light. The first optical waveguide can comprise an optical fiber. The means for providing optical communication can comprise, for example, one or more of a butt joint between an end of an optical fiber and the second optical waveguide, a fusion splice between the optical fiber and the second optical waveguide, the free space propagation of light or at least one lens. The output signal can be responsive to the intensity of the stray light. The optical apparatus can comprise a length of optical fiber that includes an active material for providing light having a first wavelength responsive to receiving pump light having a second wavelength that is different than the first wavelength. The optical apparatus can include at least one source of pump light in optical communication with the optical waveguide comprising the active material, and can include means for defining at least part of a laser cavity (e.g., a reflector, such as a fiber Bragg grating). The laser cavity can include at least part of the optical waveguide that includes the active material. The at least one source of pump light can include a plurality of laser diodes.

In yet a further aspect, the invention can provide an optical apparatus comprising an elongate optical waveguide having an elongate outer surface, where the waveguide is capable of guiding light for transmission thereof along the elongate direction, and an optical sensor for sensing light that leaks past the elongate outer surface. The optical waveguide can comprise an optical fiber. The fiber can include a core and a cladding disposed about the core, where the outer surface is the outer surface of the cladding or of a region of the fiber disposed about the cladding. The optical sensor can sense pump light provided for pumping an active element. The optical fiber can comprise a double-clad fiber having an inner cladding for guiding pump light. The sensor can be located adjacent the elongate outer surface. The optical apparatus can comprise at least one pump light source in optical communication with the optical waveguide for providing pump light. The optical apparatus can include a splice between first and second lengths of the optical waveguide, and the sensor can be arranged so as to sense light substantially only from the splice.

In one other aspect, the invention can provide an optical apparatus comprising at least first and second optical elements, where the first and second optical elements are in optical communication; and an optical sensor located so as to be capable of receiving light via free space propagation from at least two different sources, one of the sources including stray light from the first element and the other of the sources including stray light from the second element or stray light resulting from the communication between the first and second elements. One or both of the optical elements can comprise, for example, an optical fiber. A splice can join the first and second lengths of optical fiber and for providing the optical communication therebetween.

In yet a further additional aspect, the invention can include an optical apparatus comprising a generally closed housing defining an interior; an arrangement of optical elements in optical communication and for operating at a first wavelength, where the arrangement is housed within the interior of the closed housing; and at least one optical sensor within the interior capable of sensing interior ambient light including light from the arrangement of optical elements having the first wavelength. The arrangement of optical elements can include an optical fiber that includes an active material, such as a rare earth. The arrangement of optical elements can include a fiber optic coupler having at least three arms, where one of the arms is in optical communication with the optical fiber. The arrangement of optical elements can include a pump light source in optical communication with the optical fiber for providing pump light to the length of optical fiber.

In another aspect, the invention provides an optical apparatus comprising a connector having a body having an input side and output side, where the connector includes an optical sensor and a length of transmission line in communication with the sensor and available for communication therewith at a first of the input and output sides; and at least a second length of transmission line for communicating electromagnetic energy, between the input and output sides of the connector, where the second length of transmission line is not in communication with the optical sensor. The optical sensor can be associated with one of the input and output sides, such as, for example, the second of the input and output sides. The second length of transmission line can comprise a length of an electrical conductor. The second length of transmission line can comprise a length of an optical waveguide. The first length of transmission line can comprise a length of an electrical conductor or can comprise a length of optical waveguide. The at least a second transmission line can include a plurality of independent electrical transmission lines each for communicating at least one of voltage and current.

An optical sensor according to the invention can comprise, for example, a photodetector, such as, for example, a phototransistor, a photodiode or a photovoltaic cell. The optical sensor can be responsive to light having a selected wavelength, where the selected wavelength is, for example, from 850 nm to 1600 nm. The optical sensor can be based, for example, on Si, Ge, InGaAs, or Pb salts & sulfides.

The invention can also include methods.

In one aspect, the invention provides a method of sensing light comprising providing a first length of optical fiber joined to a second length of optical fiber with a splice so as to place the first and second lengths in optical communication; and sensing light leaking from the splice. The method can include propagating pump light with at least one of the lengths of fiber, the pump light for pumping an active material, and sensing can include sensing pump light leaking from the splice. The first length of fiber can be a double-clad fiber.

In another aspect, the invention provides a method of sensing light, comprising providing a first optical element; providing a second optical element; placing the first and second optical elements in optical communication, stray light resulting from the optical communication; and sensing the stray light to determine a property of light communicated between the first and second optical elements.

In an additional aspect, the invention provides a method of sensing light, comprising providing an elongate optical waveguide having an elongate outer surface wherein the waveguide is capable of guiding light for transmission along the elongate direction; and sensing light that leaks past the elongate outer surface. The method can include guiding with the elongate optical waveguide pump light for pumping an active material, and sensing light that leaks past the elongate outer surface can include sensing pump light. The elongate optical waveguide can include a core and a cladding disposed about the core, and the outer surface can be the outer surface of the cladding or of a region disposed about the cladding. The elongate optical waveguide can comprise a double-clad optical fiber.

In yet an additional aspect, the invention can comprise a method of sensing light, comprising sensing ambient light within the interior of a generally closed housing, where the interior includes an arrangement of optical elements in optical communication. The method can include providing circuitry, where the circuitry responsive to the sensor sensing a change in a property of the ambient light, provides an output signal.

Not every component is labeled in every one of the foregoing FIGURES, nor is every component of each embodiment of the invention shown where illustration is not considered necessary to allow those of ordinary skill in the art to understand the invention. The FIGURES are schematic and not necessarily to scale.

When considered in conjunction with the foregoing FIGURES, further features of the invention will become apparent from the following detailed description of non-limiting embodiments of the invention.

DETAILED DESCRIPTION

Figure 1:
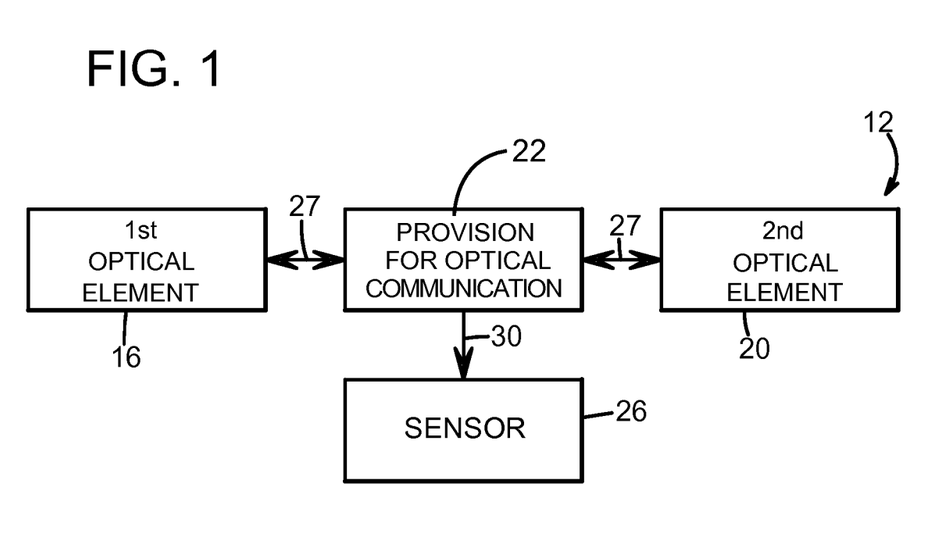
FIG. 1 schematically illustrates one embodiment of the invention.

FIG. 1 schematically illustrates one embodiment of the present invention. The apparatus 12 includes a first optical element 16 (e.g., a first optical waveguide), a second optical element 20 (e.g., a second optical waveguide), provision 22 for providing optical communication between the first and second optical elements 16 and 20 (e.g., a lens or arrangement of lenses, a mirror, such as a dichroic mirror, a beamsplitter, a fiber optic splice, a butt joint, or a fused taper joint, etc.), and an optical sensor 26, which can be a photodetector. The optical sensor 26 senses light, as indicated by reference numeral 30, from the provision 22 for providing optical communication. Typically the provision 22 for providing optical communication between the first and second optical elements 16 and 20, does not include any appreciable length of optical fiber (i.e., other than that included in a splice, fused taper or the like). The provision 22 is typically bilateral, and provides that light can be communicated from the first optical element 16 to the second optical element 20, as well as vice versa, as indicated by the dual headed arrows 27. Optical communication means at least that some light can be communicated (e.g., can propagate) from one of the optical elements to the other of the optical elements. The provision for optical communication may be designed to deliberately condition the light, that is, it may affect the transmission of light from one optical element to the other, such as by reflecting or attenuating certain wavelengths, or redirecting some light such that it is not transmitted to the second optical element.

The light 30 received by the optical sensor 26 is typically "stray" light, such as, for example, light that would typically be lost absent reception by the optical sensor 26 of the invention. Stray light is typically created as an artifact of the process of optical communication between the first and second optical elements 16 and 20. Stray light can be generated by one or more of the processes of scattering, reflection, refraction, diffraction, or other such optical processes, including fluorescence from a pumped rare earth. In general, optical waveguides, such as an optical fiber, can lose some light via Rayleigh scattering, where the light exceeds the numerical aperture of the fiber and hence leaves the fiber. Stray light can comprise light lost by a splice between optical fibers, light that is scattered from the edge of a lens, or light that fails to be captured by a lens or fiber. It is well known in the art to pump a rare earth doped optical fiber with light of a first (i.e., the "pump") wavelength so as to provide light having a second wavelength that is different than the first or pump wavelength, such as in an optical fiber laser or amplifier, where output light has the second wavelength. The rare earth often additionally provides light (e.g., fluoresces), which additional light can be at a wavelength that can be different than the pump or second wavelength. Stray light can comprise this additionally created light, or can comprise pump light or light having the second wavelength. Usually stray light is an unintentional artifact of optical communication, but it could of course be intentionally created or at least enhanced. For example, a fiber can be bent such that it loses light having a selected wavelength or wavelengths.

According to one aspect of the invention, it is realized that as a result of the higher power levels of light being transmitted by many optical systems, such as high power optical fiber amplifiers and lasers, light may be available for sensing, such as such stray light, that is more likely to be above the noise threshold of a photodetector, and can be usefully detected, such that the need to employ more complex and/or expensive optical elements, such as, for example, fused fiber couplers, is reduced.

Figure 2A:
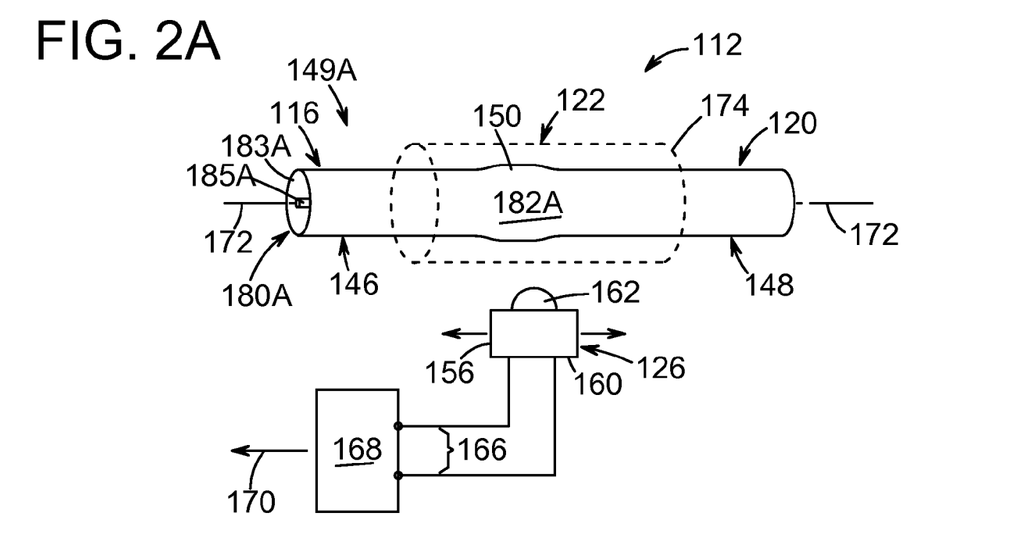
FIG. 2A schematically illustrates another embodiment of the invention.

FIG. 2A illustrates another embodiment of the present invention. The optical apparatus 112 includes first and second optical elements 116 and 120, which in the optical apparatus 112 can comprise, respectively, first and second lengths 146 and 148 of a length of an optical waveguide 149A, which in FIG. 2A is shown as an optical fiber. The splice 150 joins the first and second lengths of optical fiber 146 and 148 and provides optical communication therebetween. The optical apparatus 112 includes a sensor 126 for receiving light from the splice 150. In the embodiment shown in FIG. 2A, the sensor comprises a photodetector 156 that can include a body and dome area 162 (e.g., a lens) that receives light from the splice 150.

As defined herein, a photodetector includes an element that responsive to receiving light provides an output (e.g., an electrical output, such as a voltage or current) that is responsive to a selected property of the light (e.g., intensity). A photodetector can include, for example, a photodiode, photovoltaic cell or phototransistor. One photodetector considered appropriate for the practice of the present invention is, for example, the silicon infrared phototransistor model QSB363 available from Fairchild Semiconductor. The QSB363 has a spectral sensitivity that is highest at or near 850 nm, and that is acceptable for pump wavelengths (e.g., 915 nm) that can be used with an active material such as the rare earth ytterbium. The photodetector can be selected to be responsive to light having a selected wavelength, where, by way of example and not limitation, the selected wavelength can be in the range from 850 nm to 1600 nm. The foregoing range includes many wavelengths understood to be useful in pumping rare earths. Filters can be used to modify the spectral sensitivity of a photodetector, such as, for example, to favor sensing pump light rather than signal light, or vice versa.

A splice, such as, for example, a fusion splice, is well known in the fiber optic art. A fusion splice can be accomplished by the application of localized heat sufficient to fuse or melt the ends of two lengths of optical fiber (e.g., the lengths 146 and 148) so as to form a continuous length (e.g., the length 149A) of optical fiber from the two lengths. Fusion splicing apparatus that use an electrical spark to provide localized heating are commercially available from companies such as Fujikura and Sumitomo, both of Japan. Fusion splices between optical fibers are possible wherein the splice loss is rather low (e.g., not greater than 0.5 dB, no greater than 0.25 dB, or not greater than 0.1 dB) at an operating wavelength or over an operating range of wavelengths of the spliced optical fibers.

The sensor 126 (e.g., photodetector 156) can provide an electrical output, such as via the leads 166, and apparatus 112 can include provision for providing a selected relationship between a characteristic (e.g., power or intensity) of the light received by the sensor 126 (and hence the light propagated by one or both of the first and second lengths, 146 and 148, of optical fiber) and an output that is responsive to the electrical output of said photodetector. For example, the invention can include a circuitry 168, which can condition the output from the sensor 126 received via leads 166 and provide an output 170. For example, the circuitry can comprise a processor that includes a lookup table providing a selected relationship between the output 170 and the output received from the sensor 126. The circuitry 168 can adjust any voltage or current levels to more desirable values, or alternatively or additionally, can adjust for any nonlinear response of the photodetector 156 as a function of the power or intensity of the light received by the photodetector 156.

The optical waveguide 149A can extend along a longitudinal axis 172, and can include a protective structure 122, such as, for example, a capillary tube 174, disposed about all or part of the splice 150, as is known in the art. For a structure to be disposed about another means that the first structure suffounds, at least partially when viewed in a cross sectional plane, the other structure, and can contact the other structure as well. Typically the protective structure comprises a capillary tube that contactingly surrounds a length of the cladding of optical waveguide 149A, such as when the optical waveguide is an optical fiber. Light received from the splice 150 thus travels through the capillary tube before being received by the photodetector 156.

One or both of the first and second lengths of optical fiber 146 and 148 can comprise a double-clad structure. Double-clad fiber, as discussed in more detail below, can comprise a core, an inner cladding disposed about the core, and an outer cladding disposed about the inner cladding. The inner cladding can be useful for propagating pump light that pumps an active material (e.g., one or more rare earths, which are understood to include elements 57-71 of the periodic table) where the active material, responsive to receiving pump light having a first wavelength, provides light having a second wavelength that is different than the first wavelength. The core propagates most or all of the signal light (e.g., light having the second wavelength). The sensor 126 can be located, and/or its spectral sensitivity adjusted or selected, so as to primarily sense a selected light rather than other light (e.g., pump light rather than signal light, or signal light rather than pump light, or other light other than pump or signal light, such as light generated by nonlinear processes, such as Stimulated Raman Scattering (SRS) or Stimulated Brillouin Scattering (SBS)). Though SRS and SBS light in many instances is undesirable, in other instances the signal light may desirably include or be composed mainly of, for example, SRS light, such as in a Raman fiber laser or amplifier. Prior to splicing, one or both of the lengths of fiber 146 and 148 can have their second claddings removed, prior to splicing, where the fibers are spliced together. The splice can be coated after splicing with an optically transmissive material having a lower index of refraction than the inner cladding of the fiber, or alternatively, with a material having a higher index of refraction than the inner claddings. The latter can be useful when primarily sensing light having a wavelength different than the pump light rather than the pump light.

Figure 2B:
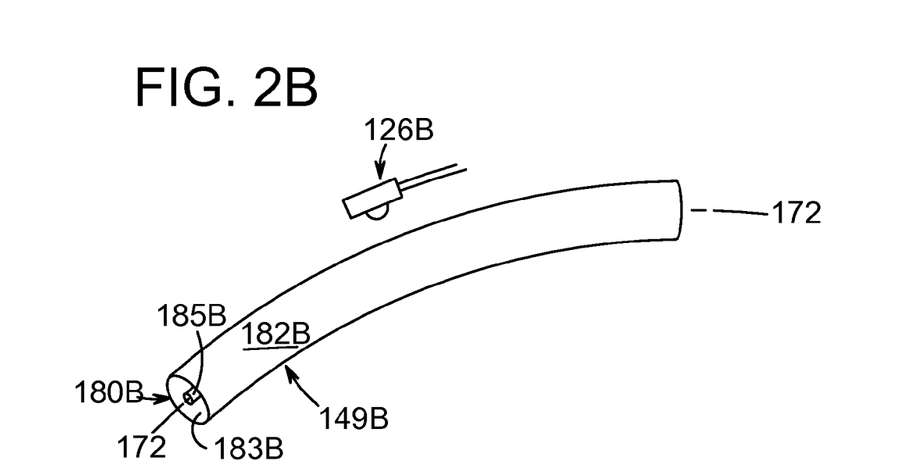
FIG. 2B schematically illustrates a further embodiment of the invention.

The optical waveguide is generally elongate, as shown by the optical waveguide 149A in FIG. 2A, and can comprise outer surfaces including the end face 180A and the elongate outer surface 182A. The elongate outer surface 182A can be the outer surface of a cladding 183A disposed about the core 185A of the optical waveguide 149A or can comprise the outer surface of another region (e.g., a protective coating, such as the recoating often placed over a splice, which need not necessarily function as a cladding) disposed about the cladding 183A. With reference to FIG. 2B, practice of the invention can include the optical sensor 126B sensing light that leaks past or from the elongate outer surface 182B of the optical waveguide 149B, regardless of the presence of a splice, which is not shown in FIG. 2B, which illustrates a unitary length of optical fiber. A splice, of course, can often enhance optical leakage.

Note that, as shown in FIGS. 2A and 2B, an optical sensor according to the invention can sense the light from substantially a single section of optical fiber, where "substantially" means that at least 70% of the light power having a selected wavelength and sensed by the sensor is received from a single section of fiber. In certain embodiments of the invention, at least 80%, or even at least 90%, of the light power having a selected wavelength and sensed by the sensor is from a single section of waveguide or fiber. A single section can be substantially straight or be a single loop, but the definition of a "single section" is meant to distinguish from many loops of a coil of fiber, where the sensor senses light from several loops. According to the invention, it is realized that a single section of waveguide (e.g., optical fiber) can often provide a considerable amount of light for sensing, and the cumulative effect of many loops is not always required. The optical waveguide 149A and 149B can be substantially free of a rare earth, or substantially free of a rare earth used for amplifying an input signal or lasing responsive to being pumped, or substantially free of a rare earth specifically added to facilitate sensing light from the fiber or waveguide, and that does substantially contribute to input signal amplification or lasing action at a selected wavelength.

"Leaks", as used herein, is meant to include light that leaves the optical waveguides 149A and 149B and radiates away from the elongate outer surfaces 182A and 182B of the fiber, as well as light that couples into evanescent modes having power outside the outer surface of the fiber and that doesn't necessarily radiate in the traditional sense. Thus, generally, "leaks past" or "leaks from" a boundary or surface means that light power is somehow coupled out of the waveguide and is present outside of a particular surface or boundary. Stray light might in certain practices of the invention include light that can be considered to have leaked past a boundary or surface and leaked light might include light considered to be stray light. However, the terms are not intended to be synonymous in all cases.

In one aspect of the invention, applicant has realized that, given the enhanced power levels of optical apparatus, such as, for example, optical apparatus that uses optical fiber, leaked light may have sufficient power to be above the noise level of a sensor and hence can be usefully sensed to determine a property of the light.

The optical waveguides 149A or 149B can propagate, in various practices of the invention, at least 100, at least 300, at least 500, at least 700, or at least 900 watts of optical power. In other practices, the optical waveguides 149A or 149B can propagate at least 1 kW, at least 1.5 kW, at least 2 kW, at least 5 kW, at least 10 kW, or even more than 10 kW, of optical power. The optical power can be power at a selected wavelength, such as, for example, a pump wavelength or light having the wavelength provided by an active material responsive to being pumped by the pump wavelength.

Figure 3:
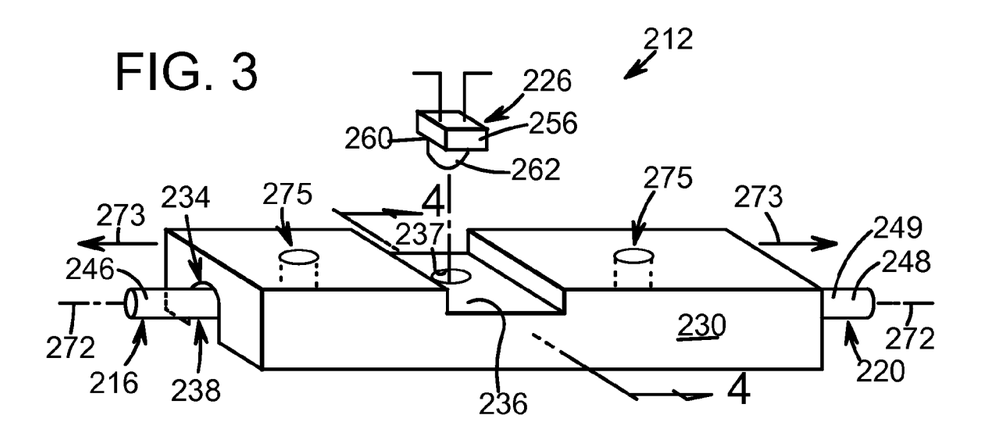
FIG. 3 schematically illustrates an additional embodiment of the invention.

FIG. 3 illustrates yet an additional embodiment 212 of the present invention. The body 230 includes a passage 234 therethrough, typically extending generally along the longitudinal axis 272, where the passage 234 is dimensioned for receiving a length of optical fiber 249, which can include first and second lengths 246 and 248 joined by a splice (not shown in FIG. 3). The passage 234 can include a longitudinally extending opening 238 wherein the body 230 can receive the length of fiber 249 including the splice without threading an end of the length of fiber through the passage 234.

The body 230 can receive the sensor 226, such as by including at least one surface 236 for receiving the sensor 226, wherein when the sensor 226 is received by the body 230 and the length of fiber 249 is received by the passage 234, light from the fiber, such as, for example, light from the splice, can be received by the sensor 226. In the apparatus 212 the sensor 226 can comprise a photodetector 256 having a body 260 and a lens 262 and the body 230 can include an aperture 237 for communicating light from the splice to the sensor 226. The aperture 237 can comprise an end or opening of a light passage that generally transversely intersects the passage 234 that receives the length of optical fiber. Light passage, as used herein, means a passage that conveys light from the fiber or light from the provision for communicating (e.g., a splice) to the sensor 226. A light passage can be empty or completely or partially filled with a gas (e.g. air) and can also include, in whole or in part, a solid or liquid, such as, for example, a dielectric solid material that transmits light to the sensor 226.

When the length of optical fiber 249 includes a protective structure, such as a capillary tube, disposed about the splice, the body 230 can be adapted for receiving the capillary tube (e.g., the passage 234 and the longitudinally extending opening 238 can be dimensioned so as to accommodate the capillary tube). The length of the capillary tube along the longitudinal axis 272 can exceed the length of the body 230 along the longitudinal axis 272, such that the body 230 receives a part of the length of the capillary tube. As indicated by arrows 273, the location of the body 230 can be positioned, relative to the fiber splice, along the longitudinal axis 272 for adjusting the amount of light received by the sensor 226. The body can further define passages 275 for receiving an adhesive (e.g., cyano acrylate) for securing the length of optical fiber 249 to the body 230, such as after the position of the body 230 relative to the splice along the longitudinal axis 272 has been selected.

Figure 4:
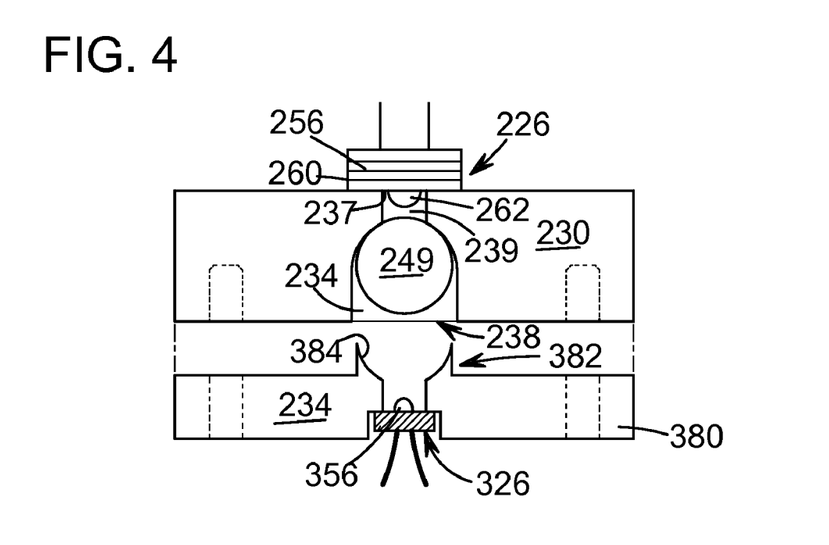
FIG. 4 shows a cross section of FIG. 3 taken along section line 4-4.

FIG. 4 is a cross section taken along section line 4-4 of FIG. 3. Shown are the body 230, the longitudinally extending passage 234, including the longitudinally extending opening 238, the sensor 226, the window 237 and the light passage 239 that intersects the longitudinally extending passage 234.

FIG. 4 also illustrates a second body 380 for mating with the body 230, where the second body 380 can close at least in part the longitudinally extending opening 238. The second body can include a longitudinally extending portion 382 for being received by the longitudinally extending opening 238 of the passage 234. The longitudinally extending portion 382 can include a surface 384 that is shaped (e.g., concave) for receiving the length of optical fiber 249.

FIG. 4 shows two sensors, namely sensors 226 and 326. The second body can receive the sensor 326. The sensors 226 and 326 can have different predetermined spectral sensitivities. For example, one of the sensors may be more sensitive to the wavelength of pump light and the other of the sensors more sensitive to the wavelength of signal light (e.g., the wavelength of the output light of a laser or amplifier). Both of the sensors 226 and 326 can be in communication with circuitry such as circuitry 168, where the circuitry can provide output(s) representative of a selected characteristic of the pump wavelength and/or a selected characteristic of the signal wavelength.

As shown in FIG. 4, the body 230 can included threaded holes and the body 380 can include appropriate through holes such that the body 380 can be secured to the body 230, such as by screws.

Applicant has realized that as the light power handled by an optical apparatus is increased, it can be advantageous or even necessary to provide appropriate thermal management for optical elements, such as, for example, gratings and splices, for which such management is not understood to have been heretofore considered. Most packaging for such components has address mechanical strength, protecting the optical element, or providing athermal features, which can include heating, rather than extracting heat energy from such an optical element.

Accordingly, in one aspect of the invention, provision is made for extracting heat energy from splices, gratings and the like. One or both of the bodies 230 and 380 can be made of a material having a high thermal conductivity (e.g., aluminum, copper, etc.). One or both of the bodies can include a material having a thermal conductivity of greater than 50 W/m K, greater than 100 W/m K, greater than 300 W/m K, or greater than 500 W/m K. Furthermore, provision is made for reducing the thermal contact resistance between the section of fiber having the grating or splice and one or both of the bodies. Preferably, use of a capillary, such as a glass capillary, over the splice or grating is to be avoided. For example, the outer surface of the fiber or splice (the splice can be considered as part of the fiber), such as the outer surface of a glass or polymer cladding or region disposed about the fiber (such as, for example, a cladding or region added during draw of the fiber or as a recoat after fabrication of a grating or splice) contacts a material (e.g., one of the bodies or a material, such as a thermal grease or epoxy in contact with one of the bodies) having a high thermal conductivity. Preferably, the fiber contacts a material having a thermal conductivity of greater than 50 W/m K. More preferably, the fiber contacts a material having a thermal conductivity greater than 100 W/m K. It can be desirable that the fiber contacts a material having a thermal conductivity greater than 300 W/m K, or even greater than 500 W/m K.

Figure 5A:
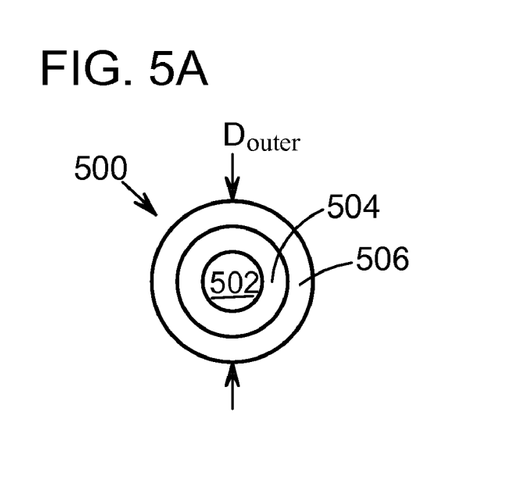
FIG. 5A is a cross section of one example of a double-clad optical fiber.

FIG. 5A shows in cross section one example of a double-clad fiber 500. The double-clad fiber 500 can include a core 502, which can comprise an active material, such as, for example, a rare earth; a first, or inner, cladding 504 disposed about the core 502; and a second cladding 506 disposed about the first cladding 504. The first cladding 504 can have a first selected numerical aperture relative to the core 502, and the second cladding 506 can have a second selected numerical aperture relative to the first cladding 504. The double-clad fiber can have a wavelength of operation, which can be the wavelength at which the active material provides light responsive to being pumped by pump light, and the core can be multimode or single mode at the wavelength of operation. The optical fiber 500 can have an outer diameter $D_{outer}$, as shown in FIG. 5A

Figure 5B:
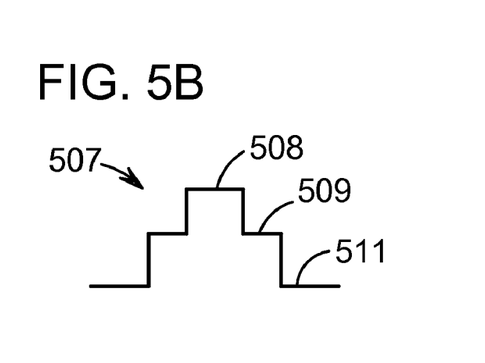
FIG. 5B schematically illustrates one possible refractive index profile for the double-clad optical fiber of FIG. 5A.

FIG. 5B schematically illustrates one possible index of refraction profile 507 that can correspond to the double-clad fiber 500, such as when the double-clad fiber comprises a conventional glass core 502 and a conventional glass inner cladding 504. The section 508 of the index of refraction profile 507 can correspond generally to the core 502; the section 509 can correspond generally to the first cladding 504; and the section 511 can correspond generally to the second, or outer, cladding 506.

The use of two sensors, as shown in FIG. 4, may be particularly useful when the provision for optical communication (e.g., the splice 250) is providing communication between at least one double-clad fiber and another fiber, which can also be a double-clad fiber.

Figures 6A, 6B:
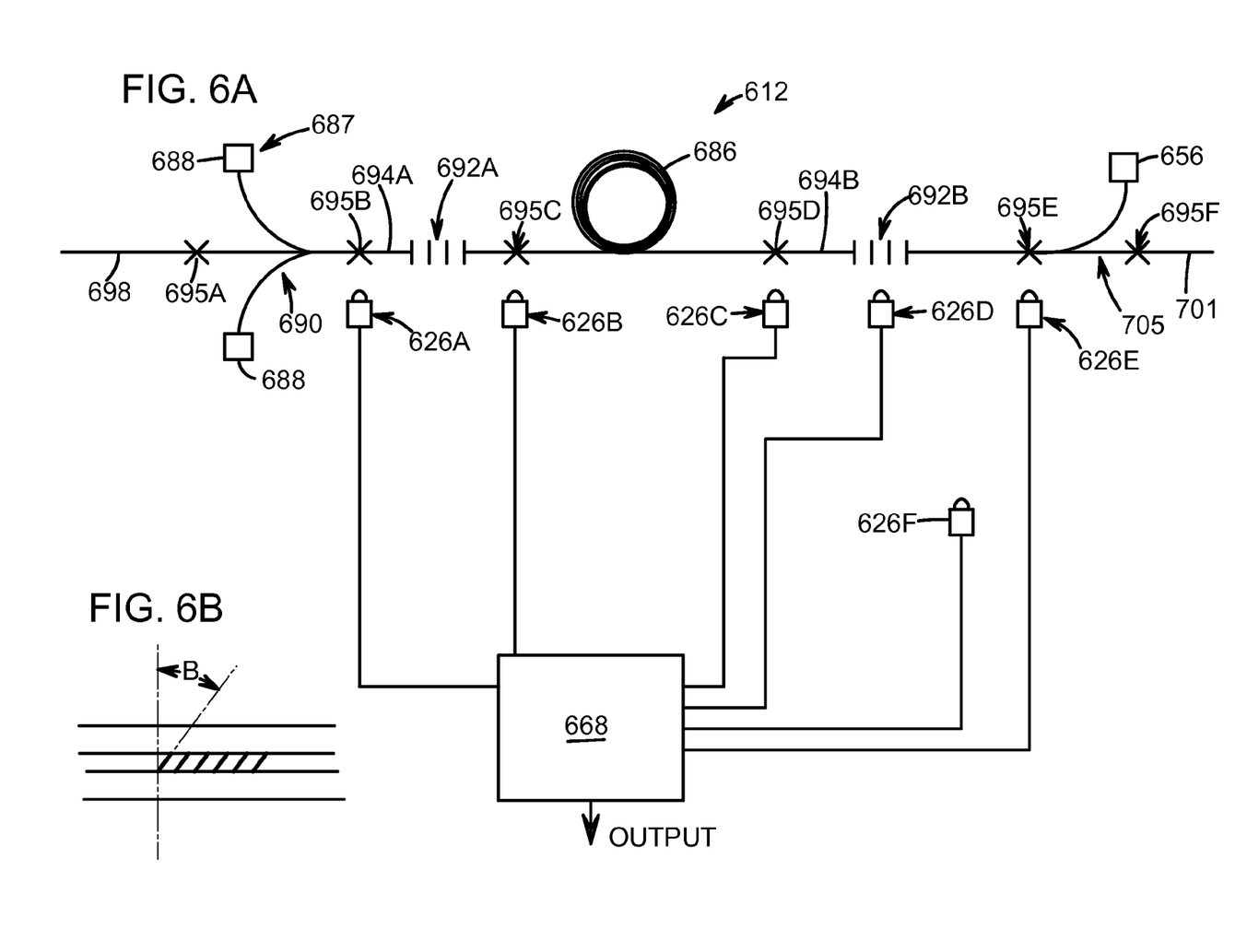
FIG. 6A schematically illustrates another embodiment of the invention.
FIG. 6B illustrates a blazed grating.

As shown in FIG. 6A, an optical apparatus 612 according to the invention can include a length 686 of optical fiber comprising an active material (e.g., a rare earth) for providing light having a first wavelength responsive to receiving light (typically referred to as "pump" light) having a wavelength that is different than said first wavelength.

The optical apparatus 612 can include a source of pump light 687, such as, for example, a laser, (e.g., a solid state laser, such as a rod laser or a fiber laser); a semiconductor based laser, (e.g., a laser diode); or another type of laser (e.g., a gas laser or ion laser). Other sources of pump light are also known (e.g., a flash lamp, a light emitting diode, or a superfluorescent fiber light source) and are considered within the scope of the invention. A source of pump light can include a plurality of the foregoing, such as, for example, a diode bar or stack, which can include a plurality of laser diodes. Shown in FIG. 6A are laser diodes 688 in optical communication with the length 686 of active fiber via the provision of the fused tapered coupler 690 and optional intervening lengths of optical fiber, which are described below in more detail.

The optical apparatus 612 can include the fused tapered coupler 690 for delivering pump light from the pump light source 687 to the active fiber 686. The optical apparatus 612 can include, in addition to or in place of the fused tapered fiber coupler 690, other provisions for delivering pump light. Provision for delivering the pump light can include one or more optical elements such as, for example, a refractive element (e.g., a lens); a reflective element (e.g., a dichroic mirror) arranged to intercept light from a pump light source and to direct the light to an end face of a optical fiber (e.g., an end face of the active fiber 686 or the end face of an optical fiber in optical communication with the active fiber); or a V-groove, mirror or other structure, such as a blazed fiber grating) comprised by an optical fiber, such as the active fiber 686 or a fiber in communication with the active fiber 686. A blazed grating is oriented at an angle to the longitudinal axis of a fiber. FIG. 6B illustrates a section of optical fiber having grating having a blaze angle β.

With reference again to FIG. 6A, the apparatus 612 can include provision for defining a laser resonator, such as, for example, one or more reflectors (e.g., a mirror, which can be formed by a cleaved end of an optical fiber or a fiber grating). A Distributed Back Reflection (DBR) laser can use two spaced fiber gratings, such as the fiber gratings 692A and 692B shown in FIG. 6A, to define a resonator therebetween, where the resonator can include fiber including active material. The fiber gratings 692A and 692B can be written in lengths of photosensitive fiber 694A and 694B, respectively, via the selective application of actinic radiation. Optical apparatus according to the invention can include a Distributed Feedback (DFB) laser that uses a single grating, such as a grating that includes an appropriate phase shift, to define a laser resonator. DFB lasers are known in the art. Other types of reflectors are also known in the art. One of the reflectors typically has a reflection selected to allow signal light (e.g., laser light) to exit the laser cavity or resonator. The term "fiber grating", as used herein, can include gratings known in the art as "short period" gratings, as well as gratings known in the art as "long period" gratings.

The optical apparatus 612 can include sensors at various locations, as indicated by the depiction of sensors 626A-626E in FIG. 6. Not all the sensors 626A-626E would typically be present in the optical apparatus 612. Typically sensors are located so as to receive light from a splice, such as from one or more splices 695A 69SF. Note that the sensor 626D is located so as to receive light whose leakage from the fiber is enhanced (typically not intentionally, but from diffraction, scattering or the like) by the fiber grating 692B. In one embodiment the fiber grating 692B typically does not reflect pump light. The sensor 626D can mainly sense pump light, mainly sense signal light, or sense both signal and pump light. The fiber grating 692B can often have, on average, a blaze of less than 3 degrees, less than 2 degrees, less than 1 degree, or less than 0.5 degree. Without reference to the foregoing, typically the grating is written so as to be substantially unblazed (i.e., substantially perpendicular to a longitudinal axis of a fiber), such that any blaze is due to process uncertainties and not due to any intent to introduce any blaze into the grating. Typically, no optical element is interposed between the grating 692B and the sensor 626D for conditioning (e.g., focusing) light before the light is sensed by the sensor 626D. The reflectivity of the grating 692B can vary, depending, for example, on whether the fiber grating serves as the "high" reflector or as the lower reflectivity output coupler of a laser, for example.

In various embodiments of the invention, the grating 692B can transmit less than 98%, less than 97%, less than 95%, less than 90%, less than 85%, less than 80%, less than 70%, less than 60%, less than 50%, less than 40%, less than 30%, less than 20%, less than 10%, less than 5%, less than 3%, less than 2%, or less than 1% of the light power incident on the grating. The foregoing percentages can refer to the light transmitted into light guided by the core of the optical fiber.

In various embodiments of the invention, the grating can reflect more than 10%, more than 12%, more than 15%, more than 20%, more than 30%, more than 40%, more than 50%, more than 60%, more than 70%, more than 80%, more than 90%, more than 95%, more than 98%, or more than 99% of the light power incident on the grating. The grating can reflect more than 10% and less than 50%, more than 15% and less than 45% of the light power incident on the grating. The foregoing percentages of reflected light power can refer to the light power reflected so as to be guided by the core of the optical fiber. In other practices of the invention, some or all of the percentages of the aforementioned reflected light power can be light transferred into one or more cladding modes, such as when the grating is a long period grating. The reflected light power can be for providing feedback for a laser, for example.

In various embodiments of the invention, the optical sensor senses a power of light that represents less 0.1%, less than 0.05%, less than 0.01%, less than 0.005%, less than 0.001%, less than 0.0005%, less than 0.0001%, less than 0.00005% or less than 0.000001% of the power of selected light associated with the optical apparatus, such as the power of light present at a selected location along an optical waveguide. In various practices of the invention, the foregoing percentages can be taken relative to the power of light incident on or transmitted by a selected splice, fiber grating, or other means for optical communication. The sensor can be arranged to sense light from the splice, fiber grating or other means for optical communication. The foregoing percentages can apply to the power of light provided as the output of a laser or amplifier. Typically the sensed light will have the same wavelength as the selected light to which the percentage is taken, though the wavelengths can be different, such as when pump light is sensed and the percentage is taken relative to the output light of a fiber laser or amplifier. The selected light can have a power of at least 10 Watts, at least 100 Watts, at least 300 Watts, at least 500 Watts, at least 700 Watts, or at least 900 Watts. In other practices, the selected light can have a power of at least 1 kW, at least 1.5 kW, at least 2 kW, at least 5 kW, or at least 10 kW.

The optical apparatus 612 can include a length of input fiber 698 and a length of output fiber 701. The length of input fiber 698 can be used to supply a seed signal to the optical apparatus 612. However, the optical apparatus 612 that includes provision for a laser resonator can in many instances function as a laser without the provision of an input signal. Optical apparatus according to the invention can include an optical amplifier. Typically for use as an optical amplifier one or both of the fiber gratings 692A and 692B are omitted from the optical apparatus 612 and input fiber 698 provides an input signal to the optical apparatus 612.

The optical apparatus 612 can include a coupler 705 that couples light to a photodetector 656 for sensing a selected characteristic of light. Optical apparatus including such a coupler 705 is considered within the scope of the invention.

FIGS. 7A to 7D illustrate embodiments of the invention illustrating, by way of example and not limitation, various provisions for optical communication considered within the scope of the present invention.

Figure 7A:
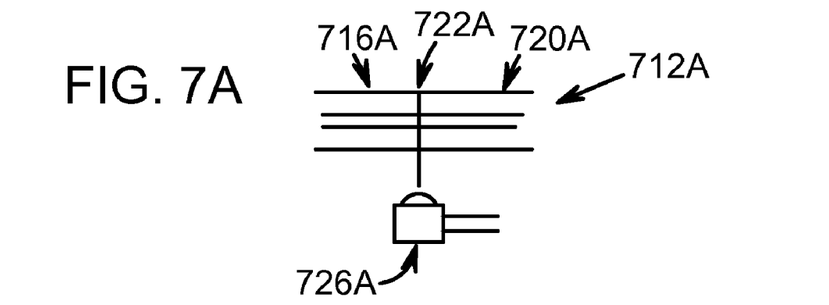
FIGS. 7A-7D schematically illustrate additional embodiments of the invention.

FIG. 7A shows an optical apparatus 712A according to the invention that includes first and second optical elements 716A and 720A (shown in FIG. 7A as first and second optical fibers), provision for optical communication 722A that includes a butt joint between the first and second optical fibers, and sensor 726A that includes a photodetector.

Figure 7B:
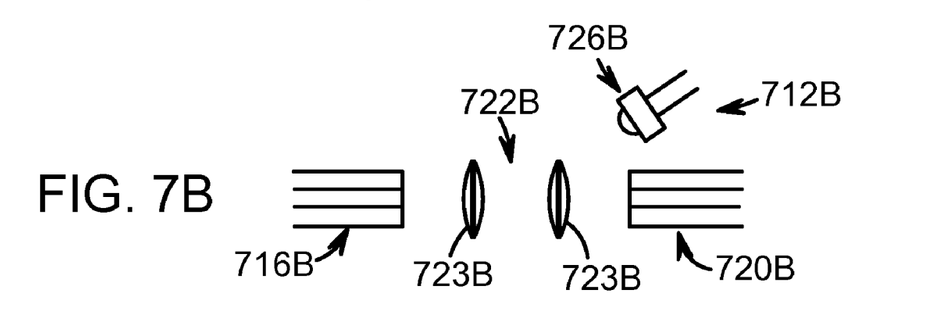

FIG. 7B shows an optical apparatus according to the invention that comprises first and second optical elements 716B and 720B (shown in FIG. 7B as first and second optical fibers), provision for optical communication 722B that includes free space transmission of light and one or more optical elements, such as a pair of lenses 723B (in some embodiments a single lens may suffice), and a sensor 726B that includes a photodetector.

Figure 7C:
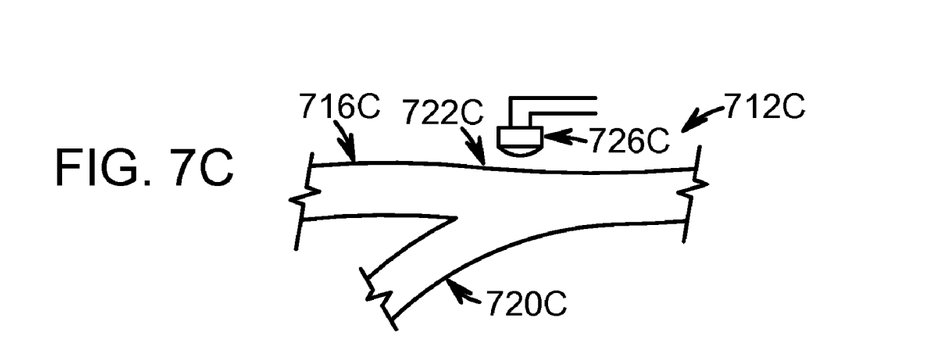

FIG. 7C shows an optical apparatus that includes first and second optical elements 716C and 720C, which are again shown as optical fibers, provision of optical communication 722C that includes the first and second fibers being joined along a selected length thereof, such as be being fused and/or tapered, and a sensor 726C that includes a photodetector.

Figure 7D:
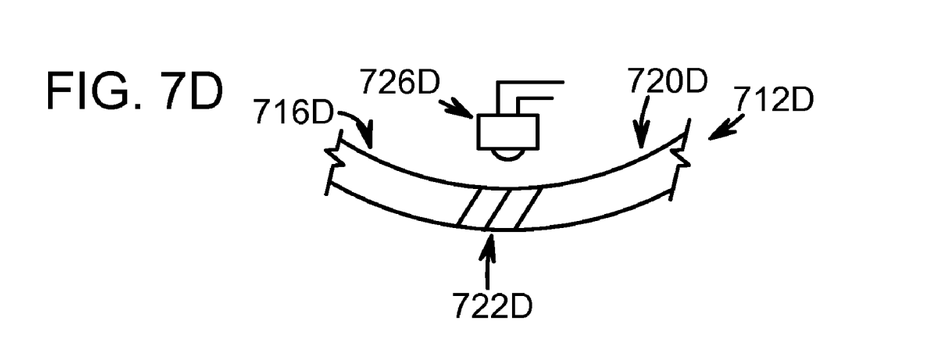

FIG. 7D shows an optical apparatus that includes first and second optical elements 716D and 720D, which are shown as lengths of a continuous length of optical fiber, provision for optical communication 722D that includes grating, which can be a blazed grating, and a sensor 726D that includes a photodetector.

Each of FIGS. 7A-7D shows the first and second optical elements as including, respectively, first and second optical fibers. One of ordinary skill in the art, informed of the present disclosure, understands that other types of optical elements are within the scope of the present invention, such as, for example, planar waveguide structures.

Figure 8A:
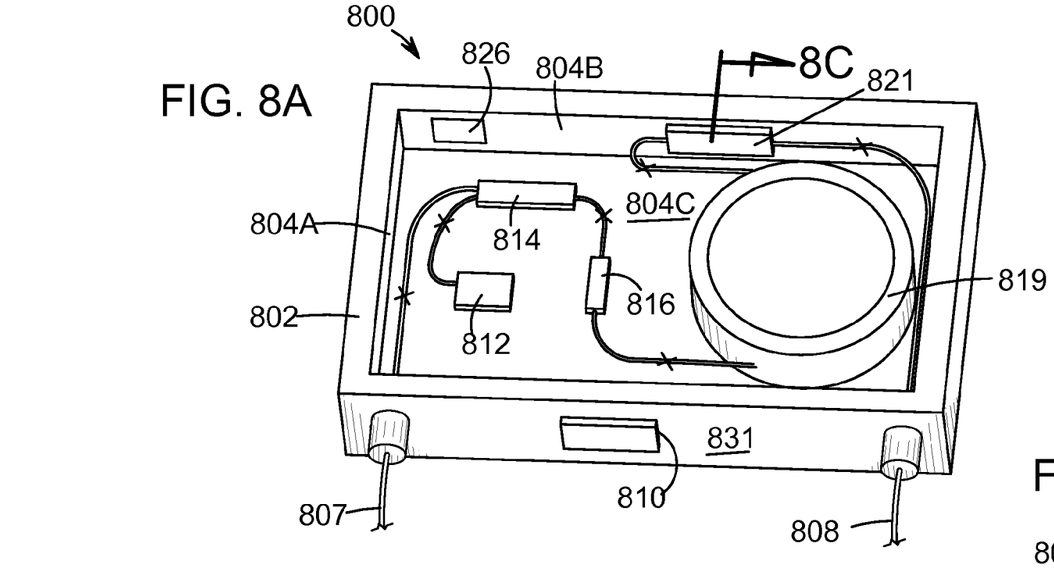
FIGS. 8A-8C illustrate further embodiments of the present invention.

FIG. 8A illustrates a further embodiment of the present invention. The optical apparatus 800 includes a housing 802 that includes walls, such as, for example, the side walls 804A and 804B and the bottom wall 804C. The housing 802 defines an interior, bounded in part by the walls 804A, 804B and 804C. The optical apparatus 800 can include an input optical fiber 807, and output optical fiber 808, and a connector, such as a "D-shell" connector, for electromagnetic communication with elements in the interior of the housing 802. Housed within the interior is an arrangement of two or more optical elements that are in optical communication and that can operate at a first wavelength. For example, the housing 802 can include within the interior the pump light source 812, a fiber optic coupler having two input arms and an output arm, where fiber optic splices ("X's" generally indicate splices) join the input fiber 807 to one input arm of the fiber optic coupler 814, the pump light source 812 to the other input arm of the fiber optic coupler 814, and the output arm of the fiber optic coupler to reflector 816 (e.g., a length of photosensitive fiber that includes a fiber grating). A length of optical fiber 819 including an active material (e.g., a rare earth) can be wound on a coil form and spliced to the reflector 816 and to a second reflector 821, which can also comprise a fiber grating. The reflectors 816 and 821 can define a laser cavity. A splice provides optical communication between reflector 821 and the length of output fiber 808. In many instances wherein the optical apparatus 800 is configured as a laser, the input optical fiber 807 is not required. In many instances wherein the optical apparatus is configured as an optical amplifier, the reflectors 816 and 821 are not required.

The arrangement of optical elements shown in FIG. 8A is exemplary, as is readily understood by one of ordinary skill in the art in light of the present disclosure. Many other arrangements of optical elements are within the scope of the present invention.

"Optical element" as used in conjunction with the present discussion and elsewhere herein, means, by way of example and not limitation, an element for the generating, guiding, conditioning (e.g., affecting one or more of the spectral characteristics, spatial characteristics, intensity or information content), coupling, or receiving of light. Examples of optical elements include optical semiconductors, such as light emitting diodes (LEDs) and laser diodes, and laser or amplifier structures including optically active materials (e.g., a rare earth doped member); optical waveguides, such as fibers and planar waveguides; gratings, mirrors, beamsplitters, lenses, prisms, attenuators; modulators and demodulators for impressing information on, or extracting information from, light; couplers, such as fiber optic couplers and wavelength division multiplexers, splices, butt joints and the like; and sensors, such as photodetectors. The foregoing categories are also by way of example and not limitation, and are not mutually exclusive, as a particular optical element can be in more than one category.

The optical apparatus 800 includes at least one optical sensor 826 within the interior. In one practice of the invention, the optical sensor 826 is located so as to be capable of receiving light via free space propagation from at least two different sources. For example, one of the sources can include stray and/or leaked light from one element, such as, for example, the fiber optic coupler 814, and the other of the sources can include stray and/or leaked light from another element, such as the length of fiber 819 including the active material or stray and/or leaked light resulting from said communication between said first and second elements, such as light leaking from a splice, such as the one shown joining the fiber optic coupler 814 and the reflector 816.

In one practice of the invention, the optical sensor 826 can be capable of sensing interior ambient light including light from the arrangement of optical elements and having the first wavelength. "Ambient light" means light that is radiated from the assembly of optical elements and generally into the interior of the housing. Ambient light will typically include light that reflects from one or more of the interior walls that bound the interior of the housing before being sensed. The sensor for receiving ambient light is typically not shielded to exclude such reflected light. The first wavelength can include, for example, wavelengths from 850 nm to 1600 nm, or wavelengths up to or greater than 200 nm. One or more of the walls 804 of the housing can be reflective at the first wavelength. Ambient light can include light that can be characterized one or both of stray light or leaked light as discussed above.

Figure 8B:
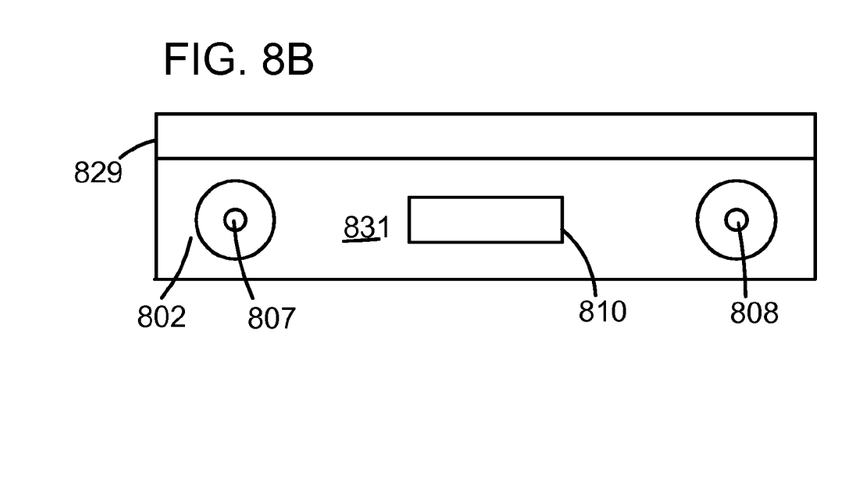

When practicing the invention such that the sensor 826 senses ambient light, the housing 802 is preferably generally closed so as to shield the sensor 826 from light "noise" originating outside of the interior of the housing. Such light noise is not usefully related to the light being communicated by the optical elements. Preferably the housing is completely closed, such as by the housing 802 including the top cover 829 shown in FIG. 8B, which is front view of the apparatus 800. If the housing cannot be completely closed, it should at least be generally closed such that the optical sensor 826 still receives enough power of ambient light to provide useful information relating to one or more of the optical elements in the interior of the housing 802.

Optical sensors according to the invention, such as, for example, the sensor 826, can be useful in monitoring the overall "health" of one or more of the optical elements. The characteristics of optical elements can vary as a function of time, usage, or environmental conditions, especially when high power levels are involved. An indication of a change in an important characteristic can allow removal of an apparatus from service or the scheduling of maintenance or replacement of a component prior to a failure that is disruptive (e.g., delays production on an assembly line) and/or that is catastrophic (e.g., optical elements are destroyed due to overheating or the like). For example, the recoat placed over a splice between fibers could be begin to fail such that additional pump light or signal (e.g., laser light) is sensed by an optical sensor, indicating potential failure before catastrophic damage occurs. Alternatively, a decrease in sensed light corresponding to a fluorescence wavelength of a pumped rare earth doped fiber could indicate that the rare earth doped fiber is failing. Particular optical elements can be sensed by a sensor associated with that element, such as a sensor disposed to primarily sense light leaking from a splice. Optical sensor 826 can also monitor such optical elements or can monitor other optical elements or parts of elements not more particularly associated with a sensor.

Figure 8C:
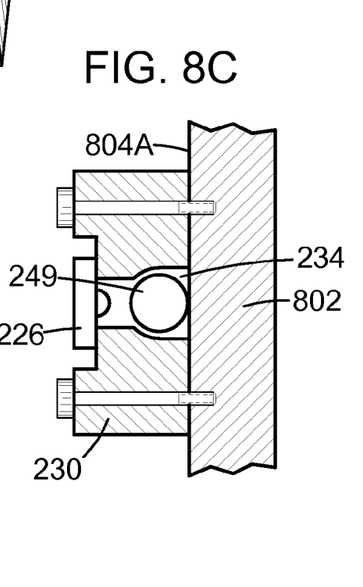

In a preferred embodiment the optical apparatus 800 includes additional optical sensors, such as the optical sensors shown in previous FIGURES, such as FIGS. 2, 3, 6 and 7. Such optical sensors can more specifically sense stray light or leakage light from a particular splice or other optical element, and in conjunction with the optical sensor 826 monitor the arrangement of optical elements shown in FIG. 8A. The arrangement of optical elements illustrated in FIG. 6 can be included within the interior of the housing 802 of FIG. 8B. The optical sensor 626F in FIG. 6 can schematically represent the optical sensor 826 shown in FIG. 8B. With reference to FIG. 8C and FIG. 4, the body 230 can mate with a second body that can comprise an inner wall, such as the wall 804A, of the housing 802.

The circuitry 668 can be responsive to one or more of the optical sensors, as shown in FIG. 6, and can provide a selected output signal responsive to receiving a selected input or combination of inputs from the optical sensors. For example, responsive to the optical sensor 626F sensing a change in a selected property of the ambient light (e.g., a predetermined increase or decrease in intensity), the circuitry 668 can provide an output signal (e.g., a message indicating such an increase or decrease and that is sent to a remote monitoring computer, such as via a local area network, a telephone line, an intranet, or the internet). Spectral characteristics of light can be sensed using two or more sensors having different spectral sensitivities. The circuitry 668 can provide a selected output responsive to change in the spectral characteristics of sensed light, such as, for example, ambient light.

FIG. 8C shows the body 230 as including the passage 234 for receiving the optical fiber 249. However, the inner wall 804A, rather than the body 230, can include part or all of the passage 234. The passage 234 can be dimensioned to receive a capillary or other structure disposed about the fiber 249.

Figure 9:
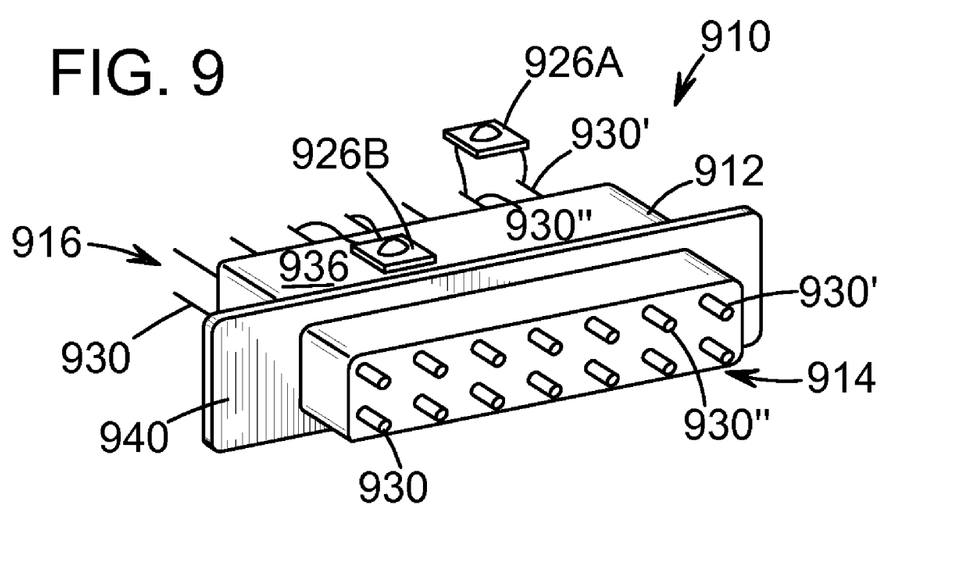
FIG. 9 schematically illustrates yet another embodiment of the present invention.

The optical sensor 826 of FIG. 8A typically communicates with the environment outside of the interior of the housing 802 via the connector 810. FIG. 9 illustrates another embodiment of the invention, and in particular illustrates the connector 810 of FIGS. 8A and 8B in more detail. The connector 810 can include an optical sensor, such as for example, the sensor 826.

With reference to FIG. 9, a connector 910 can have a body 912 and an input side 914 and output side 916. The terms "input" and "output" are used to conveniently distinguish between sides of the connector 910, and are not used herein to indicate that electromagnetic energy must travel from the input side 914 to the output side 916. In various practices of the invention signals can be "input" to the "output" side for retrieval as an "output" signal at the "input" side, as is well understood by one of ordinary skill in the art. Typically the connector 910 includes a plurality of independent transmission lines 930 for communication of electromagnetic energy between the input and output sides, 914 and 916, respectively, of the connector 910. Typically each of the lengths of the transmission line is a length of electrical conductor. However, in certain practices of the invention one or more of the lengths of transmission line can include a length of optical waveguide, such as a length of optical fiber. In principle every transmission line of the connector could be an optical waveguide, such as an optical fiber. However, the term "transmission line" is used broadly herein to indicate a path for at least some form of electromagnetic communication, which can be, by way of example and not limitation, a direct current, alternating current, radio frequencies or optical wavelengths.

The connector 910 can include an optical sensor 926A (e.g., a photodetector, such as a photodiode or phototransistor) and a length of transmission line 930' in communication with the sensor 926A. Typically the optical sensor 926A is associated with one of the sides, such as the output side 916 in FIG. 9, and the length of transmission line 930' provides communication between the optical sensor 926A and the other of the sides, such as the input side 914 shown in FIG. 9. In the embodiment shown in FIG. 9, the optical sensor 926A is in communication with two transmission lines 930' and 930". The optical sensor 926A is typically associated with one of the sides of the connector 910, as shown in FIG. 9. The optical sensor could also be associated with the output side 916 by being mounted to the wall 936 of the connector body 912. For example, the optical sensor 926B is shown as mounted to the upper wall 936. The connector 910 typically includes at least one (usually several) transmission line(s) 930 not in communication with the optical sensor.

The connector 910 shown in FIG. 9 is a "D-shell" connector wherein the "B" ends of the transmission lines 930 are female type for mating with a male type "D-shell" connector (not shown). The "D-shell" connector can include the mounting flange 940.

One or more of the optical sensors described herein can be in communication with appropriate circuitry, such as the circuitry 168, for providing an output signal from the circuitry having a desired relationship to a particular property of light.

The foregoing is by way of example and not limitation. Many other types of optical apparatus other than that specifically described above are known for conditioning light, such as, for example, lasers, filters, modulators, attenuators, couplers, polarization conditioning devices, resonators, nonlinear devices for wavelength conversion and the like (the list can go on) with which it can be desirable to sample light and hence with which the present invention may be useful.

Several embodiments of the invention have been described and illustrated herein. Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7$^{th}$ Edition, Revision 1. Furthermore, statements in the specification, such as, for example, definitions, are understood to be open ended unless otherwise explicitly limited.

Having described the invention, what is claimed as new and to be secured by Letters Patent is:

1. Optical apparatus, comprising:
    an optical fiber having a wavelength of operation, said optical fiber comprising a first length of the optical fiber joined to a second length of the optical fiber with a splice such that the first and second lengths are in optical communication;
    a photodetector for primarily sensing light leaking from said splice; and
    wherein said splice has a splice loss of no greater than 0.25 dB at the wavelength of operation.

2. The optical apparatus of claim 1 wherein said photodetector comprises one of a phototransistor and a photodiode.

3. The optical apparatus of claim 1 wherein said photodetector is responsive to light having a wavelength from 900 to 1020 nm.

4. The optical apparatus of claim 1 wherein said splice is a fusion splice.

5. The optical apparatus of claim 1 wherein said first length of fiber is a double clad fiber having an inner cladding capable of propagating pump light having a first wavelength for pumping an active material for providing light having a second wavelength that is different than the first wavelength, and wherein said photodetector primarily senses either the pump light rather than light having the second wavelength or primarily senses the light having the second wavelength rather than the pump light, the wavelength of operation comprising one of the first and second wavelengths.

6. The optical apparatus of claim 5 wherein said photodetector primarily senses the light having the second wavelength rather than the pump light having the first wavelength.

7. The optical apparatus of claim 5 wherein said photodetector primarily senses the pump light having the first wavelength rather than the light having the second wavelength.

8. The optical apparatus of claim 1 wherein said optical fiber comprises a rare earth for providing light having a second wavelength responsive to receiving pump light having a first wavelength that is different than the second wavelength, the operating wavelength comprising one of the first and second wavelengths.

9. The optical apparatus of claim 8 comprising at least one pump light source for providing the pump light.

10. The optical apparatus of claim 8 comprising at least one reflective element for forming at least part of a laser resonator.

11. The optical apparatus of claim 1 comprising a body and an adhesive securing at least one of the lengths of optical fiber to the body.

12. The optical apparatus of claim 1 wherein said splice loss is not greater than 0.1 dB.

13. The optical apparatus of claim 1, comprising:
    a body having a longitudinal passage therethrough, said passage receiving said splice, said body further comprising at least one surface receiving said photodetector such that the light leaking from said fiber splice can be received for sensing by said photodetector.

14. The optical apparatus of claim 13 wherein said surface includes an aperture for communicating the light leaking from said splice to said photodetector.

15. The optical apparatus of claim 1 wherein said photodetector senses light that has radiated away from said splice.

16. The optical apparatus of claim 1 wherein said photodetector senses evanescent light.

17. The optical apparatus of claim 1 comprising a region disposed about the splice.

18. The optical apparatus of claim 17 wherein said region comprises an elongate outer surface, and wherein said photodetector senses light that has radiated away from said elongate outer surface.

19. The optical apparatus of claim 17 wherein said region comprises a capillary tube.

20. The optical apparatus of claim 17 wherein said region comprises a protective coating.

21. The optical apparatus of claim 1 wherein one of said lengths of optical fibers comprises a cladding having a region disposed thereabout, said optical apparatus further comprising a body and an adhesive securing said region to said body.

22. The optical apparatus of claim 1 wherein said photodetector senses light substantially only from said splice.

23. Optical apparatus, comprising:
an optical fiber having a wavelength of operation, said optical fiber comprising a first length of the optical fiber joined to a second length of the optical fiber with a splice such that the first and second lengths are in optical communication;
a photodetector for sensing light leaking from said splice;
said splice having a splice loss of not greater than 0.5 dB at the wavelength of operation;
a body having a longitudinal passage therethrough, said passage receiving said splice, said body further comprising at least one surface receiving said photodetector such that the light leaking from said fiber splice can be received for sensing by said photodetector; and
a material having a thermal conductivity of greater than 50 W/m K and wherein said splice comprises an outer surface contacting said material.

24. The optical apparatus of claim 23 wherein said outer surface is the outer surface of a glass region.

25. The optical apparatus of claim 23 wherein said body comprises said material.

26. Optical apparatus, comprising:
an optical fiber having a wavelength of operation, said optical fiber comprising a first length of the optical fiber joined to a second length of the optical fiber with a splice such that the first and second lengths are in optical communication;
a photodetector for sensing light leaking from said splice;
said splice having a splice loss of not greater than 0.5 dB at the wavelength of operation; and
a material having a thermal conductivity of greater than 50 W/m K and wherein said splice comprises an outer surface contacting said material.

27. A method for sensing light, comprising:
providing first and second lengths of optical fiber having a wavelength of operation, said first and second lengths of optical fiber being joined by a splice so as to provide optical communication therebetween, said splice having a splice loss at the wavelength of operation of no greater than 0.25 dB;
providing a photodetector; and
primarily sensing light leaking from said splice with said photodetector.

28. The method of claim 27 wherein providing the first length of fiber comprises providing a double clad fiber having an inner cladding capable of propagating pump light having a first wavelength for pumping an active material having a second wavelength different than the first wavelength, and wherein sensing light comprises primarily sensing either pump light rather than light having the second wavelength or primarily sensing light having the second wavelength rather than pump light, the wavelength of operation comprising one of the first and second wavelengths.

29. The method of claim 27 wherein said splice comprises a fusion splice.

30. The method of claim 27 wherein sensing light comprises sensing light that has radiated away from said splice.

31. The method of claim 27 wherein sensing light comprises sensing evanescent light.

32. The method of claim 27 wherein sensing light comprises sensing light having the wavelength of operation.

33. The method of claim 27 comprising transmitting, via the splice, light power of at least 10 watts between the first and second lengths of optical fiber.

34. The method of claim 27 comprising transmitting, via the splice, light power of at least 100 watts between the first and second lengths of optical fiber.

35. The method of claim 27 comprising transmitting, via the splice, light power of at least 500 watts between the first and second lengths of optical fiber.

36. The method of claim 27 wherein sensing light comprises sensing a power of light that is less than 0.00005% of the light power transmitted via the splice between the first and second lengths of optical fiber.

37. The method of claim 27 wherein sensing light comprises sensing a power of light that is less than 0.000001% of the light power transmitted via the splice between the first and second lengths of optical fiber.

38. The method of claim 27 comprising disposing a region about the splice.

39. The method of claim 38 wherein said region comprises an elongate outer surface and wherein sensing comprises sensing light that has radiated away from the elongate outer surface.

40. The method of claim 38 wherein said region comprises a capillary tube.

41. The method of claim 38 wherein said region comprises a protective coating.

42. A method for sensing light, comprising:
providing first and second lengths of optical fiber having a wavelength of operation, said first and second lengths of optical fiber being joined by a splice so as to provide optical communication therebetween, said splice having a splice loss at the wavelength of operation of no greater than 0.25 dB:
providing a photodetector:
sensing light leaking from said splice with said photodetector; and
extracting heat energy from the splice, the step of extracting comprising contacting a region of the fiber with a material having a thermal conductivity of greater than 50 W/m K.

43. The method of claim 42 wherein the material has a thermal conductivity of greater than 100 W/m K.

44. The method of claim 42 wherein the material has a thermal conductivity of greater than 300 W/m K.

* * * * *